United States Patent
Galvan et al.

(10) Patent No.: US 9,796,840 B2
(45) Date of Patent: Oct. 24, 2017

(54) PROPYLENE-BASED COPOLYMER COMPOSITION FOR PIPES

(71) Applicant: BASELL POLIOLEFINE ITALIA S.R.L., Milan (IT)

(72) Inventors: Monica Galvan, Ferrara (IT); Francesca Tisi, Ferrara (IT); Giampaolo Pellegatti, Ferrara (IT); Sandro Bolognesi, Ferrara (IT); Andreas Neumann, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 26 days.

(21) Appl. No.: 15/313,306

(22) PCT Filed: Apr. 28, 2015

(86) PCT No.: PCT/EP2015/059241
§ 371 (c)(1),
(2) Date: Nov. 22, 2016

(87) PCT Pub. No.: WO2015/180918
PCT Pub. Date: Dec. 3, 2015

(65) Prior Publication Data
US 2017/0204259 A1   Jul. 20, 2017

(30) Foreign Application Priority Data

May 28, 2014 (EP) ..................... 14170326
Mar. 25, 2015 (EP) ..................... 15160704

(51) Int. Cl.
C08L 23/14        (2006.01)
F16L 9/12         (2006.01)

(52) U.S. Cl.
CPC .......... *C08L 23/14* (2013.01); *C08L 2203/18* (2013.01); *C08L 2205/025* (2013.01); *C08L 2207/02* (2013.01); *F16L 9/12* (2013.01)

(58) Field of Classification Search
CPC .. C08L 23/14; C08L 2203/18; C08L 2207/02; F16L 9/12
See application file for complete search history.

(56) References Cited

U.S. PATENT DOCUMENTS

| | | | |
|---|---|---|---|
| 2015/0322250 A1* | 11/2015 | Katsuno et al. | B32B 27/327 525/240 |
| 2016/0075865 A1* | 3/2016 | Hedesiu et al. | C08L 23/14 428/36.9 |

FOREIGN PATENT DOCUMENTS

| | | |
|---|---|---|
| EP | 2022824 A1 | 2/2009 |
| EP | 2653496 A1 | 10/2013 |
| WO | WO-9733117 A1 | 9/1997 |
| WO | WO-2006125720 A1 | 11/2006 |

OTHER PUBLICATIONS

PCT International Search Report and Written Opinion Mailed Jul. 27, 2015 (Jul. 27, 2015) for Corresponding PCT/EP2015-059241.

* cited by examiner

*Primary Examiner* — Nathan M Nutter

(57) ABSTRACT

A polyolefin composition made using a propylene/ethylene copolymer (90.0 wt % to 99.0 wt %) and a heterophasic (second) propylene/ethylene copolymer (1.0 wt % to 10.0 wt %). The composition is useful for the production of pressure pipes, e.g., for use at low temperature, and of pipes for use in heat radiating systems, among other applications. The propylene/ethylene copolymer has between 1.0 wt % and 8.0 wt % ethylene derived units. The second propylene/ethylene copolymer is made using (1) a propylene homopolymer or a propylene/ethylene copolymer (12 wt % to 52 wt %) and (2) a propylene ethylene copolymer (48 wt % to 88 wt %) that has a content of ethylene derived units ranging from 15.0 wt % to 42.0 wt %.

9 Claims, No Drawings

PROPYLENE-BASED COPOLYMER COMPOSITION FOR PIPES

This application is the U.S. National Phase of PCT International Application PCT/EP2015/059241, filed 28 Apr. 2015, claiming benefit of priority to European Patent Application No. 14170326.4, filed May 28, 2014 and European Patent Application No. 15160704.1, filed Mar. 25, 2015, the contents of which are incorporated herein by reference in their entirety.

FIELD OF THE INVENTION

The present disclosure relates to a composition comprising a propylene/ethylene copolymer and a heterophasic propylene/ethylene copolymer that is useful for applications such as the production of pressure pipes, e.g., for use at low temperature, and of pipes for use in heat radiating systems.

BACKGROUND OF THE INVENTION

Propylene/ethylene copolymers are already known in the art for the production of pipes.

For example, according to international patent application WO 97/33117, one can obtain pipes of the polypropylene plastic material having high creep resistance, high long-term pressure resistance, improved stiffness, and resistance to rapid crack propagation. According to the document, the catastrophic failure of a pipe of polypropylene plastic is prevented when the pipe is made of several layers of different polypropylene plastic material, wherein at least one layer consists of a broad molecular weight distribution (MWD) polypropylene that provides the high creep resistance and at least one layer consists of an elastomer-modified polypropylene that improves the impact strength. The broad MWD polypropylene is a mixture of a very high molecular weight propylene random copolymer with 1-10 wt % of ethylene or a higher-α-olefin repeating units and of a low molecular weight propylene polymer with low (up to 1 wt %) or zero comonomer.

When small diameter pipes are needed it is beneficial to have limited wall thickness of the pipe. The thinner wall reduces the amount of material in the pipe and improves the efficiency of the pipe manufacturing in terms of feed rate. However, when the wall thickness becomes small, the pipe may become brittle. Thus, it is necessary to use a material having high impact resistance, especially at low temperature.

Pipes for radiant heating may be made by cross-linked polyethylene. The cross-linking helps to avoid fatigue of the polymer material under the stress of water pressure and temperature cycling. However, with the cross-linking, the polyethylene pipe decreases in flexibility.

Moreover, the pipe typically arrives at the site in rolls, and its "memory" of the rolled shape complicates the task of securing it in straight runs.

The applicant found that small amount of heterophasic copolymers having certain features can be added to propylene/ethylene copolymer in order to improve impact properties and flexibility of small diameter pipes.

SUMMARY OF THE INVENTION

Thus, an embodiment of the present invention is a polyolefin composition that comprises from about 90.0 wt % to 99.0 wt % of a first propylene/ethylene copolymer, wherein i) the content of ethylene derived units is comprised between about 1.0 wt % and 8.0 wt %, (ii) the melting temperature ranges from about 135° C. to 155° C., (iii) the melt flow rate (230° C./5 kg; ISO 1133) ranges from about 0.2 g/10 min to 3.5 g/10 min, (iv) the xylene solubles at 25° C. ranges from about 20 wt % to 4 wt %; and (v) the polydispersity, PI, ranges from about 3.0 to 7.0. The polyolefin composition also comprises from about 1.0 wt % to 10.0 wt % of a second propylene/ethylene copolymer composition. The second propylene/ethylene copolymer has about 12 wt % to 52 wt % of a first component that is either (1) a propylene homopolymer or (2) a propylene/ethylene copolymer having a content of ethylene derived units ranging from about 0.1 wt % to 4.5 wt %. The second propylene/ethylene copolymer has a xylene soluble content measured at 25° C. that is less than about 10 wt %. The second propylene/ethylene copolymer also has a second component, which is from about 48 wt % to about 88 wt % of a propylene/ethylene copolymer having a content of ethylene derived units ranging from 15 wt % to 42 wt %. The resulting polyolefin composition has an melt flow rate (230° C./5 kg; ISO 1133) ranging from about 0.2 g/10 min to 4.0 g/10 min. In general, the first and second propylene/ethylene copolymers make up about 100 wt % of the polyolefin composition, based on the first and second propylene/ethylene copolymers, although the polyolefin composition may comprise other materials, such as additives, colorants, and other materials. Similarly, the first and second components form about 100 wt % of the second propylene/ethylene copolymer, the first and second components, with allowance for small amounts of other materials.

DETAILED DESCRIPTION OF THE INVENTION

The specification discloses a polyolefin composition that comprises (A) a first propylene/ethylene copolymer and (B) a second propylene/ethylene copolymer. The polyolefin composition has about 90.0 wt % to 99.0 wt % of the first propylene/ethylene copolymer. In certain embodiments, the polyolefin composition has about 92.0 wt % to 98.0 wt % of the first propylene/ethylene copolymer. Further embodiments, have about 94.0 wt % to 97.0 wt % of the first propylene/ethylene copolymer. Still further embodiments have about 94.5 wt % to 96.5 wt % of the first propylene/ethylene copolymer.

The first propylene/ethylene copolymer (A) has about 1.0 wt % to 8.0 wt % of ethylene derived units. Alternative embodiments have either about 2.0 wt % to 6.0 wt % or about 3.0 wt % to 5.0 wt % of ethylene derived units. The melting temperature of the first propylene/ethylene copolymer ranges from about 135° C. to about 155° C. The melt flow rate (230° C./5 kg; ISO 1133) of the first propylene/ethylene copolymer ranges from about 0.2 g/10 min to 3.5 g/10 min, or alternatively from about 0.6 g/10 min to 2.0 g/10 min. The xylene solubles of the first propylene/ethylene copolymer at 25° C. are about 4 wt % to 20 wt %, or alternatively about 4.0 wt % to 10.0 wt %, or about 6.0 wt % to 9.0 wt %. The polydispersity index, PI, of the first propylene/ethylene copolymer is about 3.0 to 7.0. Alternative embodiments may have a PI of about 3.5 to 6.0 or alternatively 4.0 to 5.5.

The polyolefin composition has about 1.0 wt % to 10.0 wt % of the second propylene/ethylene copolymer. In accordance with the above, the polyolefin composition may alternatively have about 2.0 wt % to 8.0 wt %, 3.0 wt % to 6.0 wt % or 3.5 wt % to 5.5 wt % of the second propylene/ethylene copolymer, respectively.

The second propylene/ethylene copolymer (B) comprises a first component (b1) and a second component (b2). The first component (b1) may be either (1) a propylene homopolymer or (2) a propylene/ethylene copolymer having a content of ethylene derived units ranging from 0.1 wt % to 4.5 wt %. The second propylene/ethylene copolymer has about 12 wt % to 52 wt % of the first component, although alternative embodiments may have about 15 wt % to 43 wt % or about 20 wt % to 33 wt % of the first component. The first component has a xylene soluble content measured at 25° C. of less than 10 wt %, which may alternatively be either less than 8 wt % r less than 7 wt %.

The second propylene/ethylene copolymer also has a second component (b2) in an amount of about 48 wt % to 88 wt %. In accordance with the above, the second propylene/ethylene copolymer may alternatively have about 57 wt % to 85 wt % or about 67 wt % to 80 wt % of the second component. The second component is a propylene/ethylene copolymer having a content of ethylene derived units in the range of about 15 wt % to 42 wt %.

The polyolefin composition has a melt flow rate (230° C./5 kg; ISO 1133) ranging from about 0.2 g/10 min to about 4.0 g/10 min. Alternative embodiments have a melt flow rate of about 0.4 g/10 min to 3.0 g/10 min or 0.5 g/10 min to 2 g/10 min.

In general, the first and second propylene/ethylene copolymers make up 100 wt % (based on the first and second propylene/ethylene copolymers) of the polyolefin composition. However, the polyolefin composition may comprise other materials, such as additives, colorants, and other materials. Similarly, the first and second components form 100 wt % of the second propylene/ethylene copolymer (based on the first and second components). The composition of the second propylene/ethylene copolymer may include other materials.

The term copolymer means a polymer containing propylene and another comonomer preferably ethylene.

In the second propylene/ethylene copolymer, the first component is a propylene homopolymer or a propylene ethylene copolymer having a content of ethylene derived units in the range of about 1.0 wt % to 6 wt %, or alternatively about 2 wt % to 4 wt %.

Also, in the second propylene/ethylene copolymer, the second component is preferably a propylene ethylene copolymer having a content of ethylene derived units in the range of about 18 wt % to 38 wt %. Alternatively, this range may be about 21 wt % to 34 wt %, or alternatively about 23 wt % to 31 wt %. The second propylene/ethylene copolymer has an intrinsic viscosity of the xylene soluble fraction at 25° C. in the range of about 2.0 dl/g to 6 dl/g, or alternatively about 2.5 dl/g to 4.5 dl/g.

With the polyolefin composition, it is possible to obtain pipes, in particular small diameters pipes having a particularly small wall thickness. The pipes made using the polyolefin composition of the present invention may be used in pressure applications.

Thus, the invention also includes a pipe made using the composition described herein, although the composition may have other applications.

The term "pipe" as used herein also includes pipe fittings, valves and all parts which are commonly necessary for e.g. a hot water piping system. Also included within the definition are single and multilayer pipes, where for example one or more of the layers is a metal layer and which may include an adhesive layer.

Such articles can be manufactured through a variety of industrial processes well known in the art, such as for instance moulding, extrusion, and the like.

The composition may further comprise an inorganic filler agent in an amount ranging from about 0.5 to 60 parts by weight with respect to 100 parts by weight of the said composition. Typical examples of such filler agents are calcium carbonate, barium sulphate, titanium bioxide and talc. Talc and calcium carbonate are preferred. A number of filler agents can also have a nucleating effect, such as talc that is also a nucleating agent. The amount of a nucleating agent is typically from 0.2 to 5 wt % with respect to the polymer amount.

The composition may also be used to manufacture pipes with walls of any configuration other than those with smooth inner and outer surface. Examples are pipes with a sandwich-like pipe wall, pipes with a hollow wall construction with longitudinally extending cavities, pipes with a hollow wall construction with spiral cavities, pipes with a smooth inner surface and a compact or hollow, spirally shaped, or an annularly ribbed outer surface, independently of the configuration of the respective pipe ends.

Fittings for pipe systems comprise elbows, connectors, pipe hangers and the like, to allow the system to be custom-built on site during installation.

As described above the composition may be used to make fittings for pipe systems.

Articles, pressure pipes and related fittings made using the composition are produced in a manner known per se, e.g. by (co-)extrusion or moulding, for instance.

Extrusion of articles can be made with different type of extruders for polyolefin, e.g. single or twin screw extruders. A further embodiment is a process wherein the composition is moulded into the final articles.

When the pipes are multi-layer, at least one layer is made of the polyolefin composition described above. The further layer(s) is/are made of an amorphous or crystalline polymer (such as homopolymer and co- or terpolymer) of R—CH=CH$_2$ olefins, where R is a hydrogen atom or a C$_1$-C$_6$ alkyl radical. Particularly preferred are the following polymers:

isotactic or mainly isotactic propylene homopolymers;

random co- and terpolymers of propylene with ethylene and/or C$_4$-C$_8$ α-olefin, such as 1-butene, 1-hexene, 1-octene, 4-methyl-1-pentene, wherein the total comonomer content ranges from 0.05% to 20% by weight, or mixture of said polymers with isotactic or mainly isotactic propylene homopolymers;

heterophasic polymer blends comprising (a) a propylene homopolymer and/or one of the co- and terpolymers of item (2), and an elastomeric moiety (b) comprising co- and terpolymers of ethylene with propylene and/or a C$_4$-C$_8$ α-olefin, optionally containing minor amounts of a diene, the same disclosed for polymer (2)(a); and amorphous polymers such as fluorinated polymers, polyvinyl difluoride (PVDF) for example.

In multi-layer pipes the layers of the pipe can have the same or different thickness.

Another application for the polyolefin composition is for use in forming a heat radiating pipe system that has at least one pipe or pipe system comprising the composition of the present invention and at least one fitting for pipe systems comprising the composition of the present invention.

The composition can be prepared by blending the various components A), b1) and b2) or by preparing component A)

and blend this component with component B) prepared in a single polymerization process by sequential polymerization steps.

The polymerization of A) and B) can be carried out in the presence of Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminium compound, such as an aluminium alkyl compound.

An external donor is optionally added.

The catalysts generally used in the process of the invention are capable of producing polypropylene with a value of xylene insolubility at ambient temperature greater than about 90%, preferably greater than 95%.

Catalysts having the above mentioned characteristics are well known in the patent literature; particularly advantageous are the catalysts described in U.S. Pat. No. 4,399,054 and European patent 45977. Other examples can be found in U.S. Pat. No. 4,472,524.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids.

Particularly suitable electron-donor compounds are esters of phthalic acid and 1,3-diethers of formula:

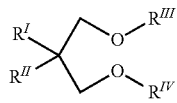

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2, or 3, said structure containing two or three unsaturations (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

Ethers of this type are described in published European patent applications 361493 and 728769.

Representative examples of said diethers are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis (methoxymethyl) fluorene.

Other electron-donor compounds may be used, such as phthalic acid esters, such as diisobutyl, dioctyl, diphenyl and benzylbutyl phthalate.

The preparation of the above mentioned catalyst component is carried out according to various methods.

For example, a $MgCl_2 \cdot nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until most or all chlorine ions have disappeared.

In the solid catalyst component the titanium compound, expressed as Ti, is present in an amount from about 0.5 to 10% by weight. The quantity of electron-donor compound which remains fixed on the solid catalyst component is about 5 to 20% by moles with respect to the magnesium dihalide.

The titanium compounds, which can be used for the preparation of the solid catalyst component, are the halides and the halogen alcoholates of titanium. Titanium tetrachloride is one such compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of 0 or N atoms, or $SO_4$ or $SO_3$ groups.

The Al-alkyl compound is generally used in such a quantity that the Al/Ti ratio be from about 1 to 1000.

The electron-donor compounds that can be used as external donors include aromatic acid esters such as alkyl benzoates, and in particular silicon compounds containing at least one Si—OR bond, where R is a hydrocarbon radical.

Examples of silicon compounds are $(tert\text{-}butyl)_2Si(OCH_3)_2$, $(cyclohexyl)(methyl)Si(OCH_3)_2$, $(cyclopentyl)_2Si(OCH_3)_2$ and $(phenyl)_2Si(OCH_3)_2$ and $(1,1,2\text{-trimethylpropyl})Si(OCH_3)_3$.

1,3-diethers having the formulae described above can also be used. If the internal donor is one of these diethers, the external donors can be omitted.

In particular, many other combinations of the previously identified catalyst components are useful for preparing the polyolefin compositions described herein. As an example, the components A) and B) may be prepared by using catalysts containing a phthalate as internal donor and (cyclopentyl)$_2$Si(OCH$_3$)$_2$ as outside donor, or the said 1,3-diethers as internal donors.

A further The Ziegler-Natta catalysts that can be used to produce a propylene polymer, as described herein, is a solid catalyst component comprising a magnesium halide, a titanium compound having at least a Ti-halogen bond as above described and at least two electron donor compounds selected from succinates and the other being selected from 1,3 diethers.

In one embodiment, Component A (the first propylene/ethylene copolymer) is produced with a polymerization process illustrated in EP application 1 012 195. In detail, the process comprises feeding the monomers to said polymerisation zones in the presence of catalyst under reaction conditions and collecting the polymer product from the said polymerisation zones. In the process the growing polymer particles flow upward through one (first) of the polymerisation zones (riser) under fast fluidisation conditions, leave the riser and enter another (second) polymerisation zone (downcomer) through which the particles flow downward in a densified form under the action of gravity, leave the said downcomer and are reintroduced into the riser, thus establishing a circulation of polymer between the riser and the downcomer.

In the downcomer, high values of density of the solid are reached, which approach the bulk density of the polymer. A positive gain in pressure can thus be obtained along the direction of flow, so that it is possible to reintroduce the polymer into the riser without the help of special mechanical means. In this way, a "loop" circulation is set up, which is defined by the balance of pressures between the two polymerisation zones and by the head loss introduced into the system.

The condition of fast fluidization in the riser is established by feeding a gas mixture comprising the relevant monomers to the riser. The feeding of the gas mixture may be effected below the point of reintroduction of the polymer into the said riser by the use, where appropriate, of gas distributor means. The velocity of transport gas into the riser is higher than the transport velocity under the operating conditions, preferably from 2 to 15 m/s.

The polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerisation zones can be effected by metering the amount of polymer leaving the downcomer using means suitable for controlling the flow of solids, such as mechanical valves.

The operating parameters, such as the temperature, are those that are usual in olefin polymerisation process, for example between about 50 to 120° C.

This first stage process can be carried out under operating pressures of between about 0.5 and 10 MPa, alternatively between 1.5 to 6 MPa.

One or more inert gases are maintained in the polymerisation zones, in such quantities that the sum of the partial pressure of the inert gases is preferably between about 5 and 80% of the total pressure of the gases. The inert gas can be nitrogen or propane, for example.

The various catalysts are fed up to the riser at any point of the said riser. However, the catalysts can also be fed at any point of the downcomer. The catalyst can be in any physical state, therefore catalysts in either solid or liquid state can be used.

Component A (the first propylene/ethylene copolymer) can be also produced with other polymerization processes known in the art such as gas phase polymerization processes slurry polymerization processes or solution polymerization processes.

The following examples are given to illustrate the present disclosure without limiting purpose.

EXAMPLES

Characterization Methods

Melting temperature and crystallization temperature: Determined by differential scanning calorimetry (DSC). weighting 6±1 mg, is heated to 220±1° C. at a rate of 20° C./min and kept at 220±1° C. for 2 minutes in nitrogen stream and it is thereafter cooled at a rate of 20° C./min to 40±2° C., thereby kept at this temperature for 2 min to crystallise the sample. Then, the sample is again fused at a temperature rise rate of 20° C./min up to 220° C.±1. The melting scan is recorded, a thermogram is obtained, and, from this, melting temperatures and crystallization temperatures are read.

Melt Flow Rate: Determined according to the method ISO 1133 (230° C., 5 kg).

Solubility in xylene: Determined as follows.

2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 ml of the filtered liquid is poured in a previously weighed aluminium container, which is heated on a heating plate under nitrogen flow, to remove the solvent by evaporation. The container is then kept on an oven at 80° C. under vacuum until constant weight is obtained. The weight percentage of polymer soluble in xylene at room temperature is then calculated.

Ethylene Content of the Polymers (C2 Content)

Ethylene content has been determined by IR spectroscopy.

The spectrum of a pressed film of the polymer is recorded in absorbance vs. wavenumbers ($cm^{-1}$). The following measurements are used to calculate C2 content:

a) Area ($A_t$) of the combination absorption bands between 4482 and 3950 $cm^{-1}$ which is used for spectrometric normalization of film thickness.

b) Area ($A_{C2}$) of the absorption band due to methylenic sequences ($CH_2$ rocking vibration) after a proper digital subtraction of an isotactic polypropylene (IPP) reference spectrum. The range 660 to 790 $cm^{-1}$.

Elongation at yield: measured according to ISO 527.
Elongation at break: measured according to ISO 527
Stress at yield: measured according to ISO 527
Stress at break: measured according to ISO 527.
Impact test: ISO180
Samples for the mechanical analysis
Samples have been obtained according to ISO 294-2
Flexural Modulus
Determined according to ISO 178.
Tensile modulus
Determined according to ISO 527
Polydispersity Index (PI): Determined at a temperature of 200° C. by using a parallel plates rheometer model RMS-800 marketed by RHEOMETRICS (USA), operating at an oscillation frequency which increases from 0.1 rad/sec to 100 rad/sec. From the crossover modulus one can derive the P.I. by way of the equation:

$$P.I.=10^5/Gc$$

in which Gc is the crossover modulus which is defined as the value (expressed in Pa) at which G'=G" wherein G' is the storage modulus and G" is the loss modulus.

Component A)

Component A was a commercial random propylene ethylene copolymer sold by LyondellBasell. The properties of the copolymer have been reported in table 1:

TABLE 1

| Component A | | | |
|---|---|---|---|
| MFR 5 Kg/230° C. | g/10 min | | 1.3 |
| C2 | wt % | | 4.0 |
| Polydispersity (PI) | | | 4.9 |
| X.S. | % | | 8.7 |
| ISO Characterization | | | |
| Flexural modulus 24 h | MPa | | 850 |
| Tensile modulus 24 h | MPa | | 850 |
| IZOD 0° C. 24 h | KJ/m2 | | 19 |
| Stress at yield | MPa | | 27 |
| Elongation at break | % | | 482 |
| Tm | ° C. | | 140 |

Component B)

Components B) are two heterophasic polymers (B1, B2) obtained by sequential gas phase polymerization, the features of the two polymers are reported on table 2

TABLE 2

| Component | | B1 | B2 |
|---|---|---|---|
| Component b1 | | | |
| Content | % wt | 21 | 30 |
| C2 | % wt | 3 | 0 |
| Xylene solubles at 25° C. | % wt | <8 | 2 |
| Component b2 | | | |
| Content | % wt | 79 | 70 |
| C2 | % wt | 15.5 | 32.7 |
| intrinsic viscosity of the xylene soluble fraction at 25° C. | dl/gr | 5.5 | 2.6 |

*C2 = ethylene derived units

The content is the amount in wt % of component b1 and component b2 so that the amount of b1+b2=100

Component A and B have been blended together at various percentages the resulting blends have been analysed.

The results have been reported on table 3

TABLE 3

| blend | | 1 | 2 | 3 | 4 | C1 |
|---|---|---|---|---|---|---|
| Component | | B1 | B1 | B2 | B1 | |
| Split* | wt % | 3 | 5 | 4 | 4 | 0 |
| MFR 5 Kg/230° C. | g/10 min | 1.2 | 1.3 | 1.1 | 1.2 | 1.2 |
| IZOD at 0° | KJ/m² | 21 | 48 | 24 | 40 | 19 |
| Flexural modulus | MPa | 780 | 830 | 790 | 780 | 850 |
| Stress at break | MPa | 31 | 33 | 32 | 20.2 | 30 |
| Stress at yield | MPa | 24.3 | 24.7 | 24.3 | 24.4 | 27 |
| Elongation at yield | % | 15.5 | 14 | 15.3 | 14.8 | 13.5 |
| Elongation at break | % | 400 | 550 | 400 | 320 | 400 |
| Melting point | ° C. | 140 | 140 | 140 | 140 | 141 |

*The remaining amount being component A

From table 3 clearly result that the impact properties of the resulting blend are high improved while the other properties remain substantially the same

What is claimed is:

1. A polyolefin composition comprising:
   A) from 90.0 wt % to 99.0 wt %; of a first propylene/ethylene copolymer wherein:
   i) the content of ethylene derived units is comprised between 1.0 wt % and 8.0 wt %;
   (ii) the melting temperature ranges from 135° C. to 155° C.;
   (iii) the melt flow rate (230° C./5 kg; ISO 1133) ranging from 0.2 g/10 min to 3.5 g/10 min;
   (iv) the xylene solubles at 25° C. ranges from 20 0.0 wt % to 4.0 wt %;
   (v) the polydispersity index, PI, ranges from 3.0 to 7.0;
   B) from 1.0 wt % to 10.0 wt %; of a second propylene/ethylene copolymer composition comprising:
   b1) from 12 wt % to 52 wt %; of a propylene homopolymer or a propylene/ethylene copolymer having a content of ethylene derived units ranging from 0.1 wt % to 4.5 wt %; and having a xylene soluble content measured at 25° C. lower than 10 wt %;
   b2) from 48 wt % to 88 wt % of a propylene/ethylene copolymer having a content of ethylene derived units ranging from 15.0 wt % to 42.0 wt %;
   wherein the resulting polyolefin composition has an melt flow rate (230° C./5 kg; ISO 1133) ranging from 0.2 g/10 min to 4.0 g/10 min; the sum A+B being 100, based on the weight percentages of A and B, and the sum b1+b2 being 100, based on the weight percentages of b1 and b2.

2. The polyolefin composition according to claim 1 wherein the content of ethylene derived units ranges from 2.0 wt % to 8.0 wt %.

3. The polyolefin composition according to claim 1 wherein the component b2) is a propylene/ethylene copolymer having an content of ethylene derived units ranging from 18 wt % to 38 wt %, the propylene/ethylene copolymer having an intrinsic viscosity of the xylene soluble fraction at 25° C. ranging from 2.0 dl/g to 5.0 dl/g.

4. The polyolefin composition according to claim 1 wherein the melt flow rate (MFR) (230° C./5 kg; ISO 1133) ranges from 0.4 to 3.0 g/10 min.

5. Pipe systems and sheets comprising a polyolefin composition according to claim 1.

6. Pressure pipe systems according to claim 5.

7. Mono- or multilayer pipes and sheets wherein at least one layer comprises the polyolefin composition according to claim 1.

8. Fitting for pipe systems comprising a polyolefin composition according to claim 1.

9. Heat radiating pipe system comprising at least one pipe system according to claim 5.

\* \* \* \* \*

UNITED STATES PATENT AND TRADEMARK OFFICE
CERTIFICATE OF CORRECTION

PATENT NO. : 9,796,840 B2
APPLICATION NO. : 15/313306
DATED : October 24, 2017
INVENTOR(S) : Monica Galvan et al.

It is certified that error appears in the above-identified patent and that said Letters Patent is hereby corrected as shown below:

On the Title Page

Item (57)    Line 11    In the Abstract, delete "propylene ethylene" and insert --propylene/ethylene--

In the Specification

| | | |
|---|---|---|
| Column 3 | Line 12 | Delete "r" and insert --or-- |
| Column 3 | Lines 41-42 | Delete "propylene ethylene" and insert --propylene/ethylene-- |
| Column 3 | Line 46 | Delete "propylene ethylene" and insert --propylene/ethylene-- |
| Column 6 | Line 31 | Delete "0" and insert --O-- |
| Column 8 | Line 28 | Delete "(C2" and insert --($C_2$-- |
| Column 8 | Line 33 | Delete "C2" and insert --$C_2$-- |
| Column 8 | Line 65 | Delete "propylene ethylene" and insert --propylene/ethylene-- |
| Column 9 | Line 3 | In Table 1, delete "C2" and insert --$C_2$-- |
| Column 9 | Line 9 | In Table 1, delete "KJ/m2" and insert --KJ/$m^2$-- |
| Column 9 | Line 12 | In Table 1, delete "Tm" and insert --$T_m$-- |
| Column 9 | Line 4 | In Table 2, delete "C2" and insert --$C_2$-- |
| Column 9 | Line 9 | In Table 2, delete "C2" and insert --$C_2$-- |
| Column 9 | Line 12 | In Table 2, delete "*C2" and insert --*$C_2$-- |

In the Claims

Column 10    Line 20    In Claim 1, delete "20 0.0" and insert --20.0--

Signed and Sealed this
Third Day of March, 2020

Andrei Iancu
*Director of the United States Patent and Trademark Office*